United States Patent [19]
Thompson et al.

[11] 4,195,816
[45] Apr. 1, 1980

[54] VALVE ACTUATOR

[75] Inventors: Richard L. Thompson; Murray J. Hubbert; Vernon J. Wade, all of Houston, Tex.

[73] Assignee: Bettis Corporation, Houston, Tex.

[21] Appl. No.: 955,485

[22] Filed: Oct. 27, 1978

Related U.S. Application Data

[63] Continuation-in-part of Ser. No. 787,882, Apr. 15, 1977, Pat. No. 4,120,479.

[51] Int. Cl.² .................... F16K 31/524; F16K 31/528
[52] U.S. Cl. ........................................ 251/229; 74/57; 251/252
[58] Field of Search .................... 74/57, 89.15; 92/31, 92/33, 116, 138, 14; 251/56, 58, 229, 251, 252

[56] References Cited

U.S. PATENT DOCUMENTS

| | | | |
|---|---|---|---|
| 1,177,609 | 4/1916 | Edwards | 74/57 |
| 2,673,964 | 3/1954 | Morton et al. | 74/57 |
| 3,046,802 | 7/1962 | Cupedo | 251/252 |
| 3,207,468 | 9/1965 | Lauducci et al. | 251/58 |
| 3,417,960 | 12/1968 | Stehlin | 251/14 |
| 3,492,880 | 2/1970 | Pearson | 251/58 |
| 3,797,324 | 3/1974 | Sheesley et al. | 92/138 |

Primary Examiner—Martin P. Schwadron
Assistant Examiner—G. L. Walton
Attorney, Agent, or Firm—Robert W. B. Dickerson

[57] ABSTRACT

A valve actuating device for causing both rotation and linear movement of a valve.

4 Claims, 4 Drawing Figures

VALVE ACTUATOR

This application is a continuation in part of Ser. No. 787,882 filed Apr. 15, 1977, now U.S. Pat. No. 4,120,479 issued Oct. 17, 1978.

BACKGROUND OF THE INVENTION

Actuators have long been used to control the opening and closing of valves. One such type valve must be rotated approximately 90 degrees between an open and closed positions. Some rotatable valves must first have their stem moved linearly. It is to control the operation of such valves that applicants' invention is directed.

SUMMARY OF THE INVENTION

A source of rotation, such as the yoke-containing actuator of U.S. Pat. No. 3,797,324, is attached to a rotatable input sleeve. The input sleeve, thereby, is caused to rotate within a further sleeve. Each sleeve is slotted, and a pin extends transversely of the sleeves, through the slots. By virtue of the relationship of the slots, the aforementioned pin is caused to both move linearly and to rotate, about the actuator's axis. Inasmuch as said pin is fixed to an output member, and it to a controlled valve, the desired operation is achieved.

DESCRIPTION OF A PREFERRED EMBODIMENT

Figure 4:
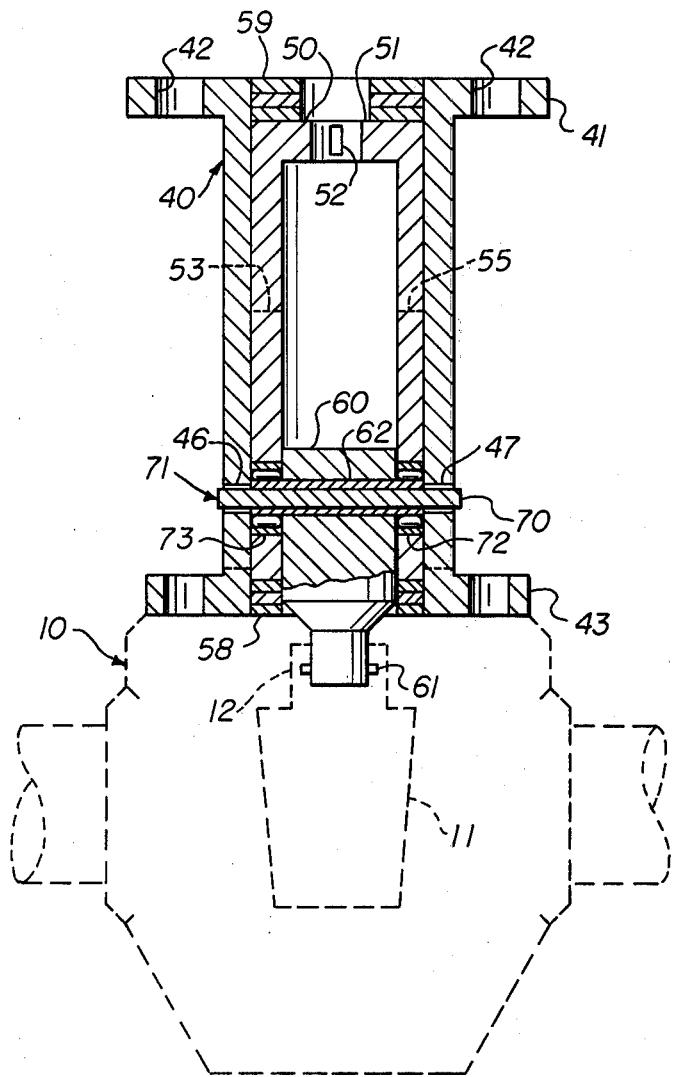
FIG. 4 is a vertical section taken along lines 4—4 of FIG. 2.

In FIG. 4, a generalized valve housing 10 is illustrated, having therein a valve member 11 with stem 12 attached. In the type valve of concern, the valve member must rise some distance prior to rotating 90 degrees from a closed to an open or fluid passing position.

Figure 1:
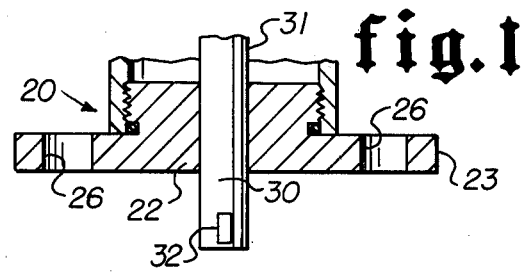
FIG. 1 is a partial vertical section through the input shaft housing.
Figure 2:
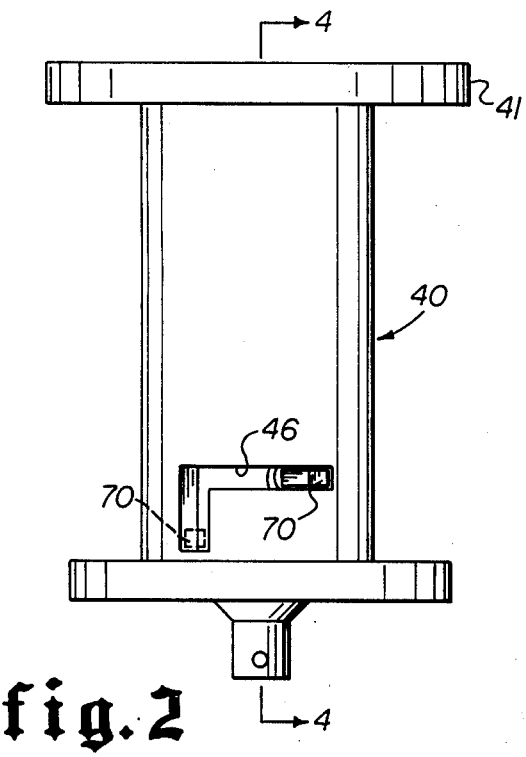
FIG. 2 is an elevation of the mounting sleeve.
Figure 3:
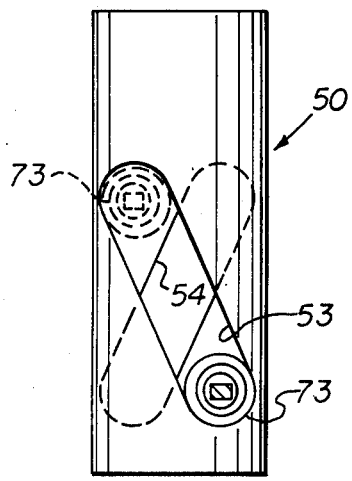
FIG. 3 is an elevation of the input sleeve.

Consider now the housing 20, partially shown in FIG. 1. Such housing may be closed at one end by head 22. The latter mentioned head includes mounting flange 23. Slidably positioned within housing 20, and through head 22, is input shaft 30. Head 22 slidably and sealingly accomodates shaft 30. The upper end of shaft 30 would be attached to a source of rotation, such as the rotary yoke exemplified by U.S. Pat. No. 3,797,324. The lower end of shaft 30 includes engagement means, such as key 32, for a purpose hereafter described.

Flange 23 of housing 20 is adapted to be fixed to flange 41 of mounting sleeve 40 by the insertion of bolts (not shown) through bolt holes 26, 42. At the opposite end of the mounting sleeve is a further flange 43, adapted to permit mounting on valve housing 10. In the direction of flange 43, a pair of horizontally disposed, L-shaped slots, 46, 47, extend through the walls of mounting sleeve 40. In the case of each slot, looking inwardly from outside the sleeve, the longer leg thereof extends in the same direction from the shoter leg, i.e., clockwise or counterclockwise.

Rotatably positioned within the interior of mounting sleeve 40 is input sleeve 50. Thrust washers 57, 58 are provided to restrict relative linear movement between sleeves 40 and 50. At one end of sleeve 50, head 51 has means, such as keyway 52, for receiving engagement means 32 of shaft 30. Opposite sleeve head 51, a pair of angularly disposed slot 53, 54, extend through the walls of input sleeve 50. Again, looking inwardly from outside sleeve 50, each of such slots continues in the same direction from one extremity to the other, i.e., clockwise or counterclockwise. Adjacent slots 53, 54, an output shaft 60 is movably positioned at least partially within input sleeve 50, with valve stem engaging lug 61 adapted to be fixed to valve stem 12 in any convenient means. Fitted, as by pressing for example, within passageway 62 through output shaft 60, is a roller assembly 71 having oppositely positioned rollers, 72, 73, which rollers ride within input sleeve slots 53, 54. Fitted within rollers assembly 71 is cross pin 70, whose opposite ends extend through slots 46, 47 in mounting sleeve 40.

In operation, sleeve 40 would be mounted on a valve housing such as 10. Input shaft 30, would be engaged with a source of rotation (not shown). It should be understood that input shaft 30 may actually be the output shaft of said source of rotation, and flange 23 be an integral portion of the housing of said source. Assume that valve 11 is in open or up position, and it is desired to close the valve. Input sleeve 50 would be rotated by input shaft 30, and it, in turn by the source of rotation, and thereby angularly move slide rollers 72, 73 within slots 53, 54, in sleeve 50, and rotate pin 70 within slots 46, 47 of sleeve 40, and thereby rotate output shaft 60 along with valve stem 12 and valve member 11, until pin 70 enters adjacent the short leg of L-shaped slots 46, 47. Thereafter, further rotation of input shaft 30 would move pin 70 downwardly in such short leg, and set the valve member in its closed postion. Opening the valve is caused by the reverse of the above described series of events. Opposite rotation of shaft 30, causes rotational movement of attached sleeve 50, moves pin 70 upwardly, unseating valve member 11, moves pin 70 upwardly to the long leg of slots 46, 47, and further rotation of input shaft 30 horizontally moves pin 70 within slots 46, 47, and by virtue of rollers 72, 73, within angled slots 53, 54, rotates valve member 11 by approximately 90 degrees to an open position.

Although only a single embodiment has been described, it should be obvious that numerous modifications would be possible by one skilled in the art without departing from the spirit of the invention, the scope of which is intended to be limited only be the following claims.

We claim:
1. A valve actuator comprising:
   a (cylinder carrying a) rotatable input shaft having means at one end thereof for attachment to an input sleeve;
   a hollow mounting sleeve adapted to be fixed (both to said cylinder and) to a valve, said mounting sleeve having an opposed pair of slots of L-shaped configuration through the wall thereof;
   a substantially hollow input sleeve, rotatably mounted within said mounting sleeve, and having means for attachment to said input shaft (and being adapted to be attached to said piston rotatably positioned within said mounting sleeve), said input sleeve having an opposed pair of arcuately configured slots through the wall thereof;
   an output member axially and rotatably carried by said input sleeve, said output member carrying a pin, the opposed ends of said pin extending through both of said (respective) pairs of slots of said input sleeve and said mounting sleeve (and), said output member having means adapted to fix said output member to a valve.

2. The actuator of claim 1 wherein said mounting sleeve includes means for preventing relative linear movement between said input and mounting sleeves.

3. The actuator of claim 1 wherein said pin carries rollers movable within said slots of said input sleeve.

4. The actuator of claim 3 wherein the ends of said pin ride within said slots in said mounting sleeve.

* * * * *

UNITED STATES PATENT AND TRADEMARK OFFICE
CERTIFICATE OF CORRECTION

PATENT NO. : 4,195,816

DATED : April 1, 1980

INVENTOR(S) : Richard L. Thompson

It is certified that error appears in the above-identified patent and that said Letters Patent are hereby corrected as shown below:

Claim 1, line 51, cancel "cylinder carrying a"

lines 54-55, cancel "both of said cylinder and"

lines 60-62, cancel "and being adapted to be attached to said piston rotatably positioned within said mounting sleeve"

line 68, cancel "respective"

line 69, cancel "and".

Signed and Sealed this

Fifteenth Day of July 1980

[SEAL]

Attest:

SIDNEY A. DIAMOND

Attesting Officer

Commissioner of Patents and Trademarks